(12) United States Patent
Hebbelinck

(10) Patent No.: US 11,464,231 B2
(45) Date of Patent: Oct. 11, 2022

(54) COMPOSITION FOR STIMULATING IMMUNE RESPONSES IN PLANTS

(71) Applicant: Ilicitor LLC, Castle Rock, CO (US)

(72) Inventor: Sebastien Hebbelinck, Castle Rock, CO (US)

(*) Notice: Subject to any disclaimer, the term of this patent is extended or adjusted under 35 U.S.C. 154(b) by 156 days.

(21) Appl. No.: 16/874,448

(22) Filed: May 14, 2020

(65) Prior Publication Data

US 2020/0359623 A1  Nov. 19, 2020

Related U.S. Application Data

(60) Provisional application No. 62/848,256, filed on May 15, 2019.

(51) Int. Cl.
| | |
|---|---|
| *A01N 59/00* | (2006.01) |
| *A01N 43/16* | (2006.01) |
| *C05D 9/00* | (2006.01) |
| *A01N 35/06* | (2006.01) |
| *A01N 59/26* | (2006.01) |
| *A01N 47/28* | (2006.01) |

(52) U.S. Cl.
CPC ............ *A01N 43/16* (2013.01); *A01N 35/06* (2013.01); *A01N 47/28* (2013.01); *A01N 59/00* (2013.01); *A01N 59/26* (2013.01); *C05D 9/00* (2013.01)

(58) Field of Classification Search
CPC ........ A01N 43/16; A01N 35/06; A01N 47/28; A01N 59/00; A01N 59/26; C05D 9/00
See application file for complete search history.

(56) References Cited

U.S. PATENT DOCUMENTS

| | | | | |
|---|---|---|---|---|
| 4,764,201 | A * | 8/1988 | Iino | ........................ A01N 33/06 504/250 |
| 2009/0229331 | A1* | 9/2009 | Wells | ........................ C05G 5/27 71/23 |
| 2013/0260993 | A1* | 10/2013 | Linden | .................. A01N 43/16 504/100 |

* cited by examiner

*Primary Examiner* — Johann R Richter
*Assistant Examiner* — Danielle Sullivan
(74) *Attorney, Agent, or Firm* — Holzer Patel Drennan

(57) ABSTRACT

Compositions and method for producing a systemic acquired response (SAR) in plants. The resulting SAR may improve plant health and corresponding yields. In an example, the composition comprises a base solution and an effective amount of chitosan (*Aspergillus niger*) (e.g., in an amount of about 0.04 wt % of the composition). The base solution may include organic material, vitamin K compound, and nitrogen. Additionally or alternatively, the composition may include adding to the composition at least one of potassium, phosphorus, or an acidic organic polymer. Still further, the composition may include a micronutrient comprising at least one of boron, calcium, copper, iron, manganese, sulfur, silicon, or zinc. The composition may be applied as a foliar spray or used to irrigate the plant.

7 Claims, 10 Drawing Sheets

| | Treatments | |
|---|---|---|
| | Control | Treated |
| Plant height (cm) | 58.5 | 68 |
| Days until 50% flowers | 44 | 40 |
| Weight of 1000 seeds (g) | 7.4 | 11.74 |
| Production (kg/ha) | 1209 | 1328 |

FIG. 3

COMPOSITION FOR STIMULATING IMMUNE RESPONSES IN PLANTS

CROSS REFERENCE TO RELATED APPLICATION

The present application claims benefit of priority to U.S. Provisional Patent Application No. 62/848,256, entitled "COMPOSITION FOR STIMULATING IMMUNE RESPONSES IN PLANTS" and filed on 15 May 2020, which is specifically incorporated by reference herein for all that it discloses or teaches.

BACKGROUND

Plant pathogens can cause serious damage in agriculture, resulting in critical losses of yield, quality and profit. Examples are parasitic organisms such as phytopathogenic fungi. Further pathogens are Oomycetes, which are not true fungi but fungal-like organisms that use the same mechanisms as fungi to infect plants. Plants respond to infection by pathogens by activating their innate immune system. The plant defense systems recognize molecular patterns that are common to many classes of pathogens, e.g. fungal chitin, and may respond to pathogen-specific virulence factors (effectors). Pathogen recognition triggers ion channel gating, oxidative burst, cellular redox changes, protein kinase cascades and other responses that either directly activate cellular changes such as cell wall reinforcement, or activate changes in gene expression that lead to the formation of defensive compounds, e.g. directed to fight infection or to make the plant less attractive to pathogens.

Fungal diseases and diseases caused by oomycetes can be controlled through the use of fungicides in agriculture. Fungicides are chemical compounds or biological substances used to kill or inhibit fungi or oomycetes or their spores. Fungicides sometimes also have an effect on other plant pathogens such as bacteria, viruses, nematodes or insects. However, certain fungicides often remain on food for human consumption, thus posing a danger to human or animal health. Accordingly, it is of interest to stimulate the plant immune system in order to control diseases caused by parasites or pathogens such as fungi, oomycetes, bacteria, viruses, nematodes and insects.

SUMMARY OF THE INVENTION

Broadly, disclosed herein is a new composition that when applied to plants provides a systemic acquired resistance or response (SAR) in the plants or in other words stimulates the immune system of the plants to vitalize plant health. The SAR triggered by application of the disclosed composition increases cell multiplication, metabolism, and calcium mobilization to thereby increase vegetative flow production and root growth and limit the impact of phytophysiological disorders related to the calcium ion such as leaf burn and weakened stems. The disclosed composition may be administered both as a foliar spray and through irrigation.

A first aspect of the present disclosure includes a composition for providing a systemic acquired response (SAR) in a plant. The composition comprises a base solution comprising an aqueous mixture including nitrogen and chitosan (*Aspergillus niger*).

Another aspect of the present disclosure includes a method for producing the composition according to the first aspect.

Yet another aspect of the present disclosure includes a method for treatment of a plant using an effective amount of the composition according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 3 illustrates a table illustrating results of application of a composition according to the present disclosure relative to a control group of plants that were untreated.

DETAILED DESCRIPTION

Figure 1:
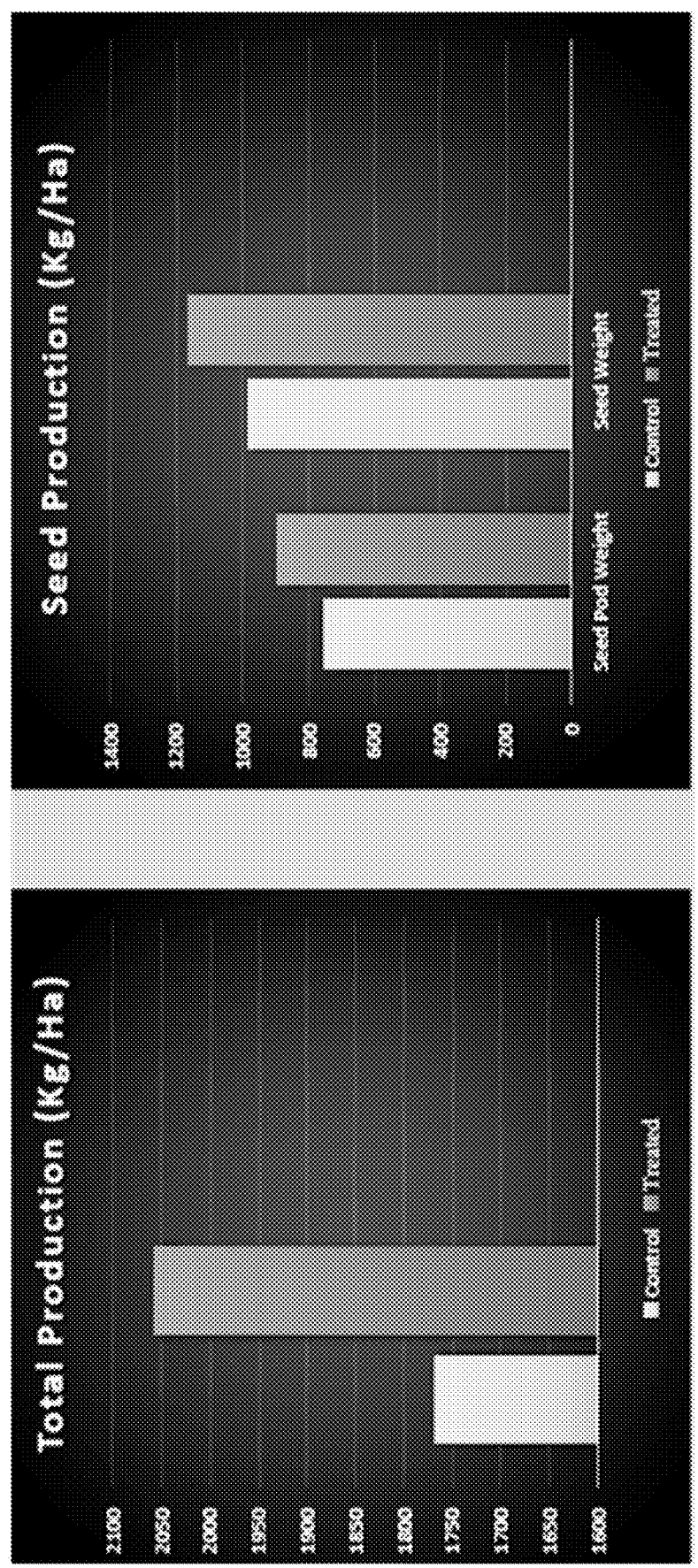
FIG. 1 illustrates a chart illustrating total production and seed production of treated and untreated portions of a plant.

In one aspect, the disclosed composition includes a number of primary nutrients such as at least nitrogen, potassium, phosphorus, and an acidic organic polymer for facilitating delivery of the nitrogen, potassium, and phosphorus to the cells of the plants. Nitrogen is essential for promoting photosynthesis and growth of the plants, potassium facilitates water and nutrient transportation as well as protein and starch synthesis, and phosphorus triggers the plants to generate additional roots, seeds, and fruit flowers as well as fight disease. In one arrangement, the acidic organic polymer may be fulvic acid.

The disclosed composition may also include a number of micronutrients such as boron to facilitate cell division within the plants; calcium to strengthen cell walls, activate certain enzymes, and send signals that coordinate certain cellular activities; copper to activate certain enzymes in plants involved in lignin synthesis; iron to aid the process of photosynthesis within the plants; manganese to facilitate cell formation; sulfur to facilitate disease resistance and promote growth; silicon to improve drought tolerance, delay wilting in certain crops where irrigation is withheld, and enhance the plant's ability to resist micronutrient and other metal toxicities; and zinc to promote hormone production.

In one arrangement, a composition that when applied to plants provides a systemic acquired resistance or response (SAR) in the plants includes the following ingredients: nitrogen in the composition at least in the amount of approximately 6.0 wt %, potassium in the composition at least in the amount of approximately 2.0 wt %, phosphorus in the composition at least in the amount of approximately 3.2 wt %, boron in the composition at least in the amount of approximately 0.021 wt %, calcium in the composition at least in the amount of approximately 0.013 wt %, copper in the composition at least in the amount of approximately 0.025 wt %, iron in the composition at least in the amount of approximately 0.07 wt %, magnesium in the composition at least in the amount of approximately 0.2 wt %, manganese in the composition at least in the amount of approximately 0.01 wt %, sulfur in the composition at least in the amount of approximately 1.1 wt %, silicon in the composition at least in the amount of approximately 0.013 wt %, zinc in the composition at least in the amount of approximately 0.009 wt %, an acidic organic polymer in the composition at least in the amount of approximately 3.0 wt %, and water in the composition at least in the amount of approximately 65.23 wt %.

In one arrangement, a composition that when applied to plants provides a SAR in the plants includes the following ingredients: nitrogen in the composition in the amount of no more than approximately 12.5 wt %, potassium in the composition in the amount of no more than approximately 6.3 wt %, phosphorus in the composition in the amount of no more than approximately 8.1 wt %, boron in the composition in the amount of no more than approximately 0.065 wt %, calcium in the composition in the amount of no more than approximately 0.078 wt %, copper in the composition in the amount of no more than approximately 0.084 wt %, iron in the composition in the amount of no more than approximately 0.348 wt %, magnesium in the composition in the amount of no more than approximately 0.8 wt %, manganese in the composition in the amount of no more than approximately 0.034 wt %, sulfur in the composition in the amount of no more than approximately 3.4 wt %, silicon in the composition in the amount of no more than approximately 0.041 wt %, zinc in the composition in the amount of no more than approximately 0.034 wt %, an acidic organic polymer in the composition in the amount of no more than approximately 10 wt %, and water in the composition in the amount of no more than approximately 77.33 wt %.

In another example arrangement, a composition that when applied to plants provides a SAR in the plants include chitosan (*Aspergillus niger*) and a base solution. The chitosan may be provided at least in an amount of approximately 0.04 wt %. The base solution may include organic material, water-soluble vitamin K compound, and nitrogen in an aqueous solution. The organic material may be provided at least in an amount of approximately 44 wt %, the vitamin K compound may be provided at least in an amount of approximately 4 wt %, and the nitrogen may be provided at least in an amount of approximately 7.7 wt %. In other examples, the base solution may be according to any one of the foregoing descriptions of the composition.

In an example production process for this arrangement, the base solution may be heated to approximately 38 degrees Celsius (100 degrees Fahrenheit). Chitosan in an amount of approximately 0.01 wt % may be added to the base solution. The resulting intermediate composition may be agitated or mixed for approximately 60 minutes (1 hour). After initial mixing/agitation, an additional 0.01 wt % of chitosan may be added to the intermediate composition and again mixed/agitated for 60 minutes (1 hour). This process may be repeated with addition of 0.01% chitosan to the composition over a 4 hour total duration to bring the composition to the 0.04 wt % chitosan content.

It has been unexpectedly found that the compositions disclosed herein advantageously increases plant yield, aids plant immunity, and promotes healthier root grow. The various nutrients disclosed herein may be obtained from any appropriate sources. As one example, the nitrogen may be obtained from urea, the potassium may be obtained from potash, and the phosphorus may be obtained from black phosphorus.

In one arrangement, a method of making the disclosed composition may include bringing 375.03 ml of water to a temperature of approximately 100° F. in a first container. Silicon may first be added to the water in the first container and then agitated for a period of time such as 15 min. Thereafter, nitrogen, potassium, phosphorous, boron, calcium, copper, iron, magnesium, manganese, sulfur, silicon, and zinc may be added to the mixture in the first container and then the entire mixture may again be agitated such as for 15 min. In a second container, 375.05 ml of room temperature water may be mixed with 60 mg of fulvic acid powder then the mixture may be agitated for approximately five minutes or the like. The mixture from the second container may then be added to the mixture in the first container after which the composition is complete.

Figure 2:
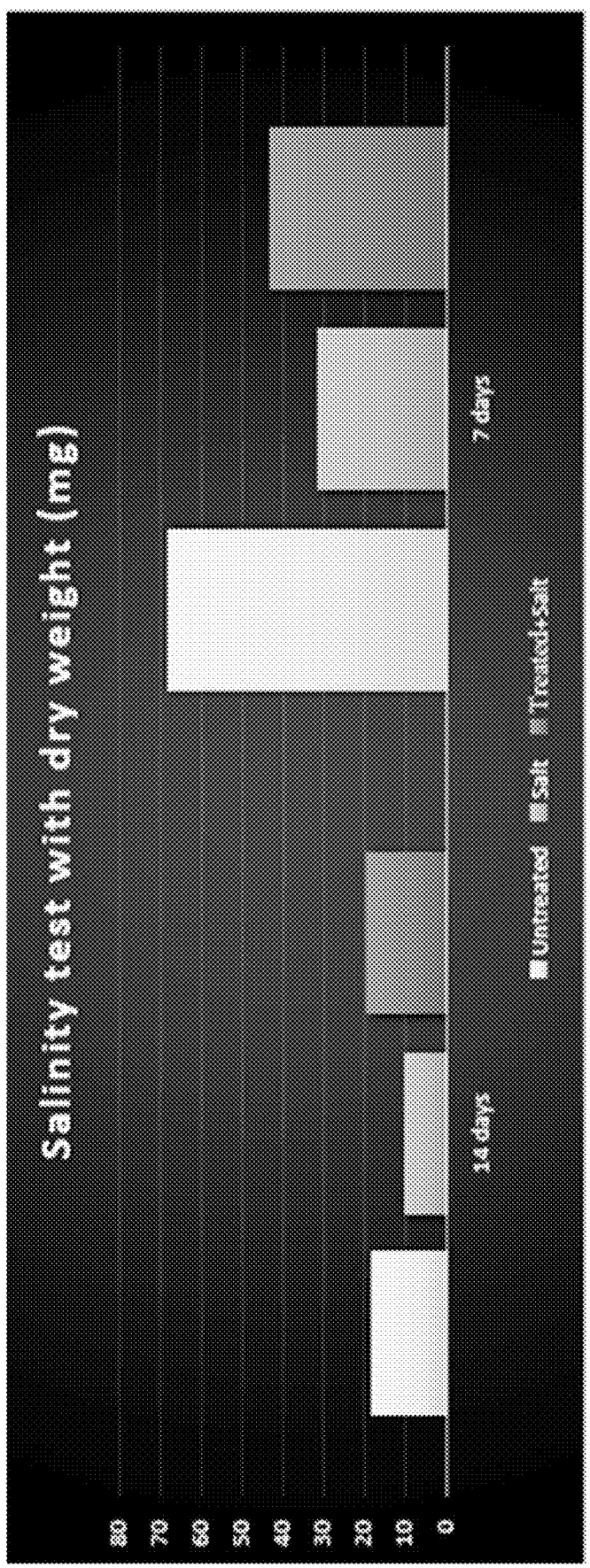
FIG. 2 illustrates a chart illustrating plant weights of treated and untreated plants in response to regular salt stress.

Comparison Studies:

1) With reference to FIG. 1, a foliar spray of the disclosed composition at a 0.2% dilution was applied to approximately half of a 15 m$^2$ plot of *Papaver somniferum* (breadseed poppy) every three days for 15 days. The charts presented in FIG. 1 includes total production and seed production of the treated and untreated portions of the plot after the 15-day treatment period:

2) One liter of the foliar spray from study 1 with a 25% salt dilution was applied to four *Arabidopsis thaliana* plants (thale cress). Additionally, a 25% salt (NaCl) dilution spray without the disclosed composition was apply to four thale cress plants (at a rate of liter per three plants). Furthermore, four thale cress plants served as untreated control plants (no composition or additional salt was applied). All of the plants were in an indoor environment. In *Arabidopsis thaliana* plants exposed to regular salt stress, instead of 30% growth reduction like untreated plants, treated plants showed better recovery vs. these adverse conditions as shown in the chart presented in FIG. 2.

3) One liter of the composition from study 1 was applied as a foliar spray and via drip irrigation to 6,000 *Pennisetum glaucum* plants (pearl millet) spread over one hectare. Plants treated with the disclosed composition grew taller and had better flower induction as shown in the chart presented in FIG. 3.

Figure 4:
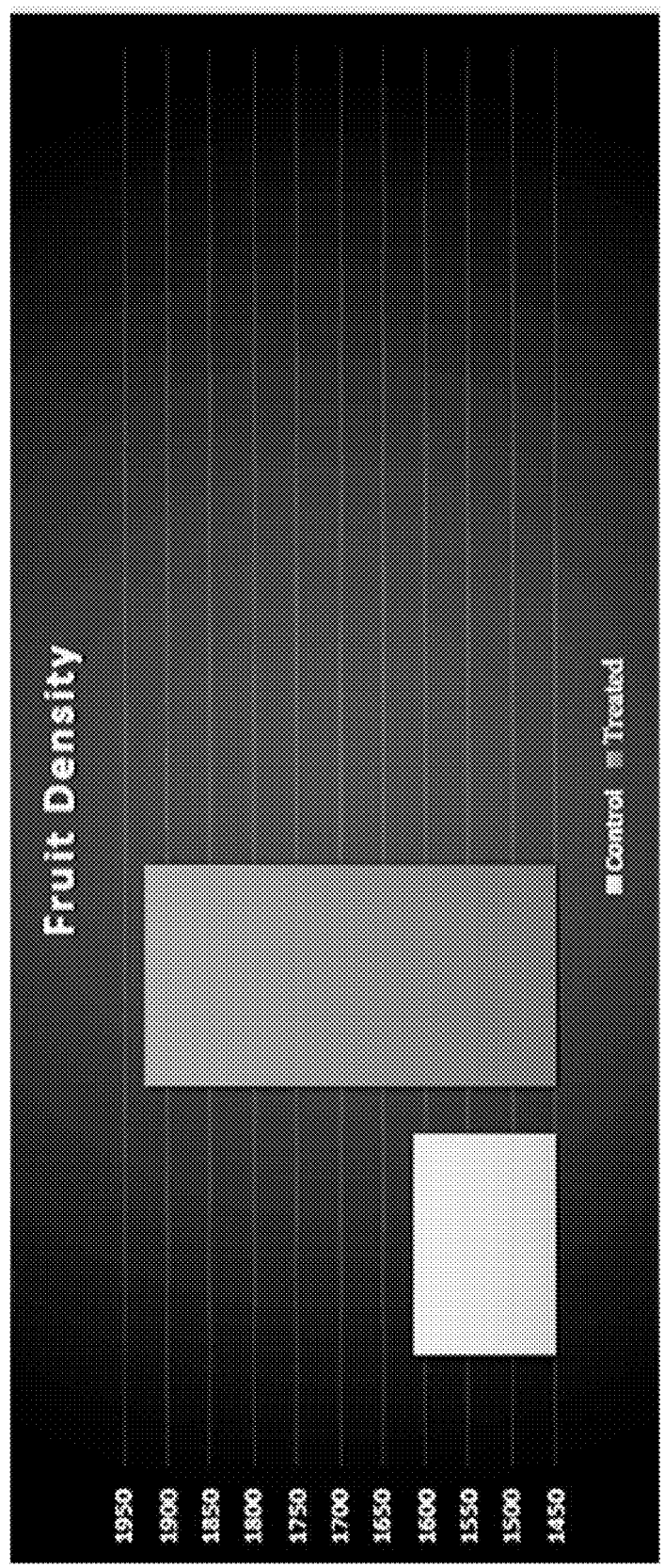
FIG. 4 illustrates a chart illustrating improved fruit density for treated plants relative to untreated plants.

4) Gala apple trees: Commercial Facility Size: 5000 plants/ha, drip-irrigation of the composition from study 1; Trial in 12 similar tree sizes; 4 applications (Days 0-15-30-50) dose 0.2% (Fruits density=Fruits per tree) with results presented in FIG. 4.

Figure 5:
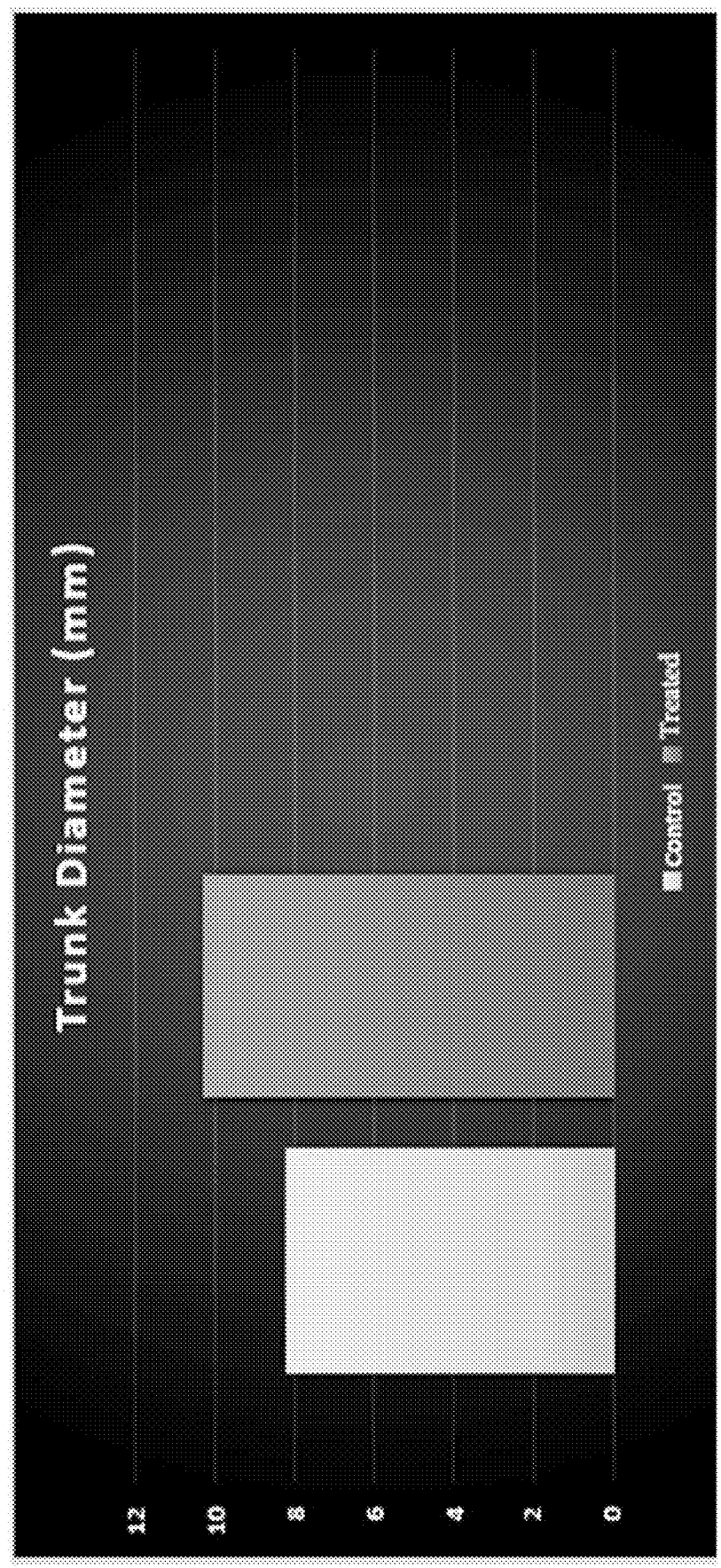
FIG. 5 illustrates a chart illustrating improved trunk diameter for treated plants relative to untreated plants.

5) A foliar spray of the disclosed composition at a 0.2% dilution was applied to a four-year-old olive tree on each of Dec. 10, 2018, Jan. 5, 2019, Feb. 13, 2019, and Mar. 13, 2019 at a rate of 400l/ha. As compared to untreated olive trees in the same area, the treated olive tree had a larger diameter after the treatments as shown in FIG. 5.

Figure 6:
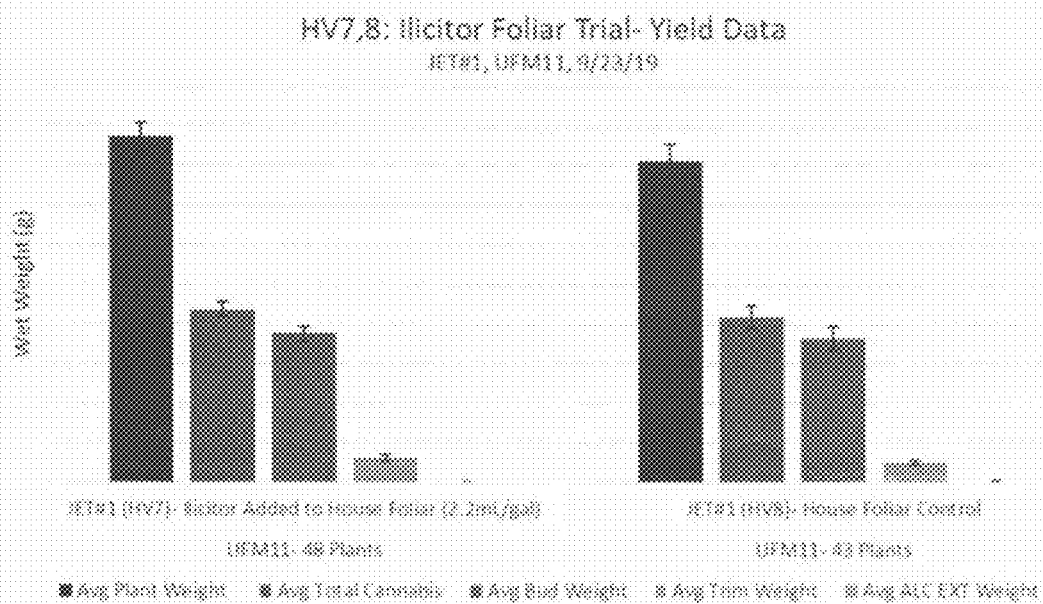
FIGS. 6-10 illustrate charts depicting results for a number of trials of the composition disclosed herein applied to plants.
Figure 7:
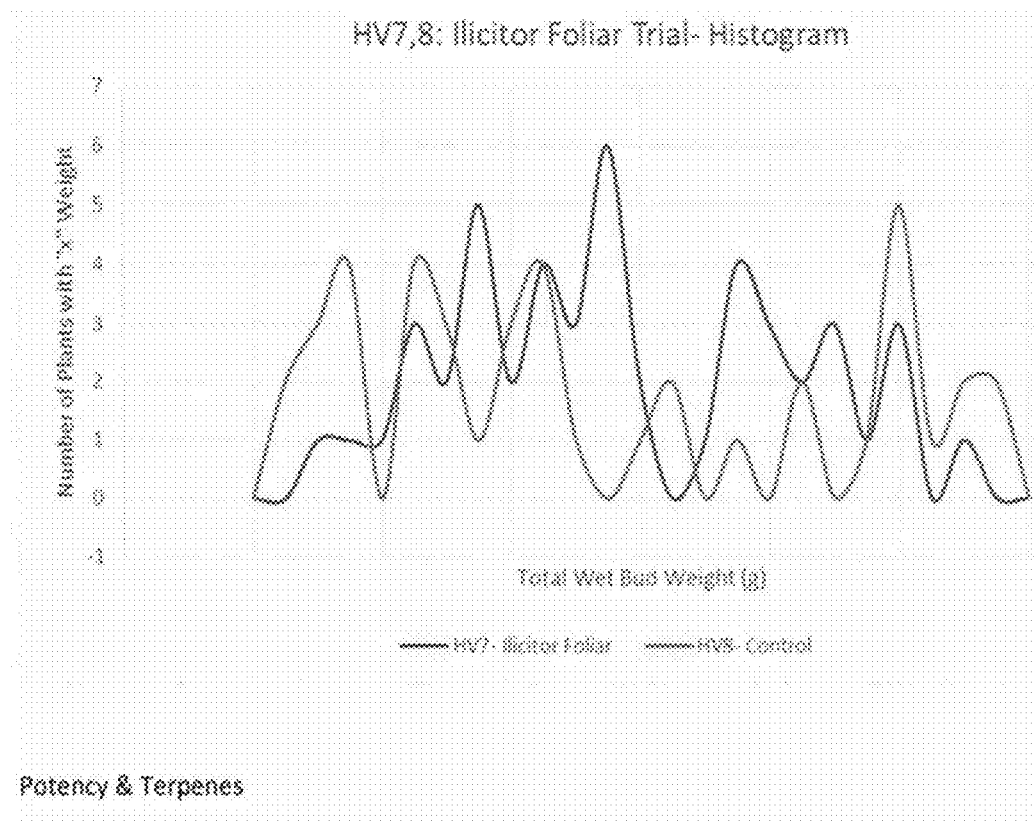
Figure 7:
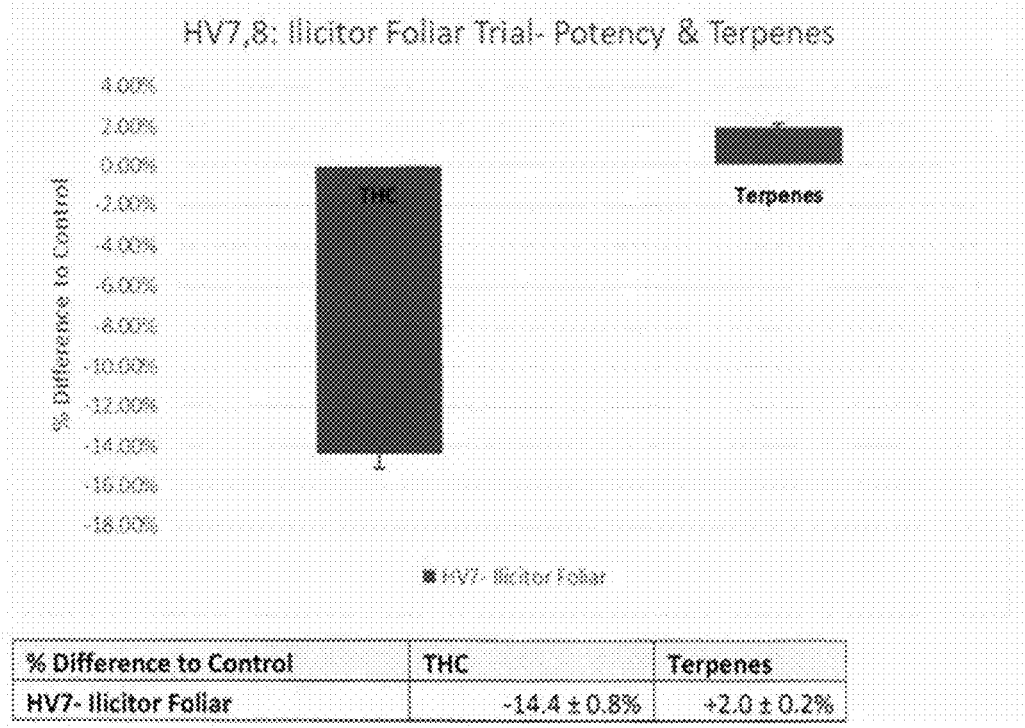

6) FIGS. 6-7 illustrate results for a trial application of a composition described herein in which results labeled HV7 were treated with a foliar spray of the composition and results labeled HV8 relate to control plants. As can be seen, average weights for treated plants exceeded those of the control demonstrating more robust growth.

Figure 8:
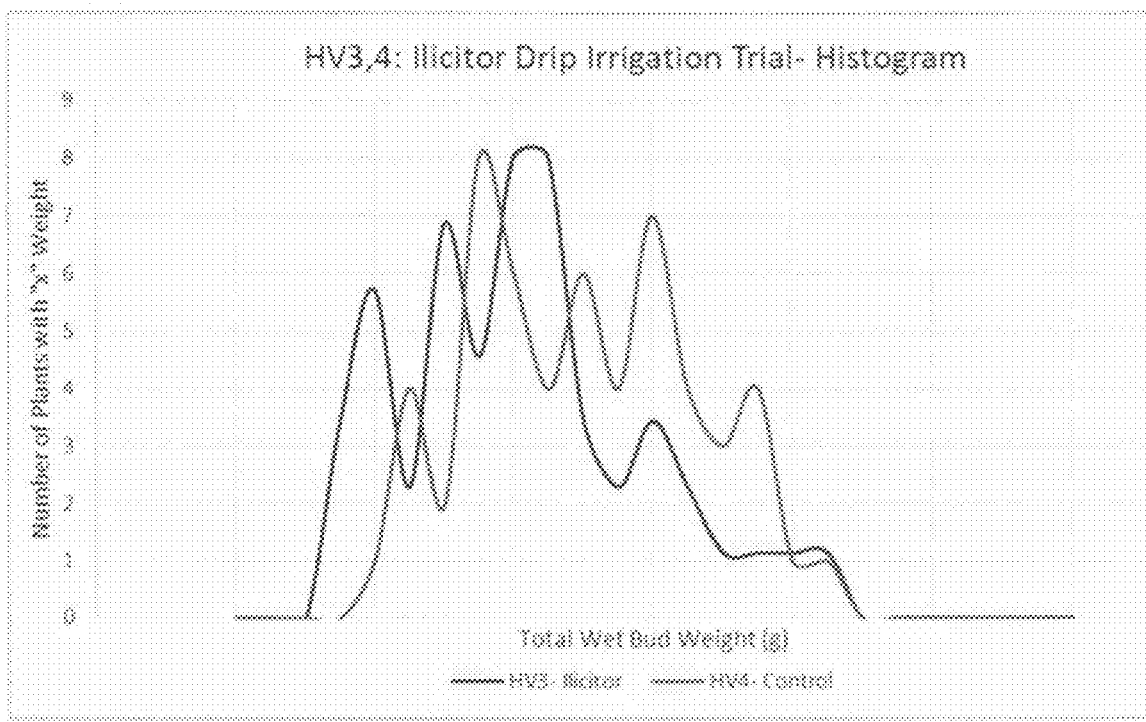
Figure 8:
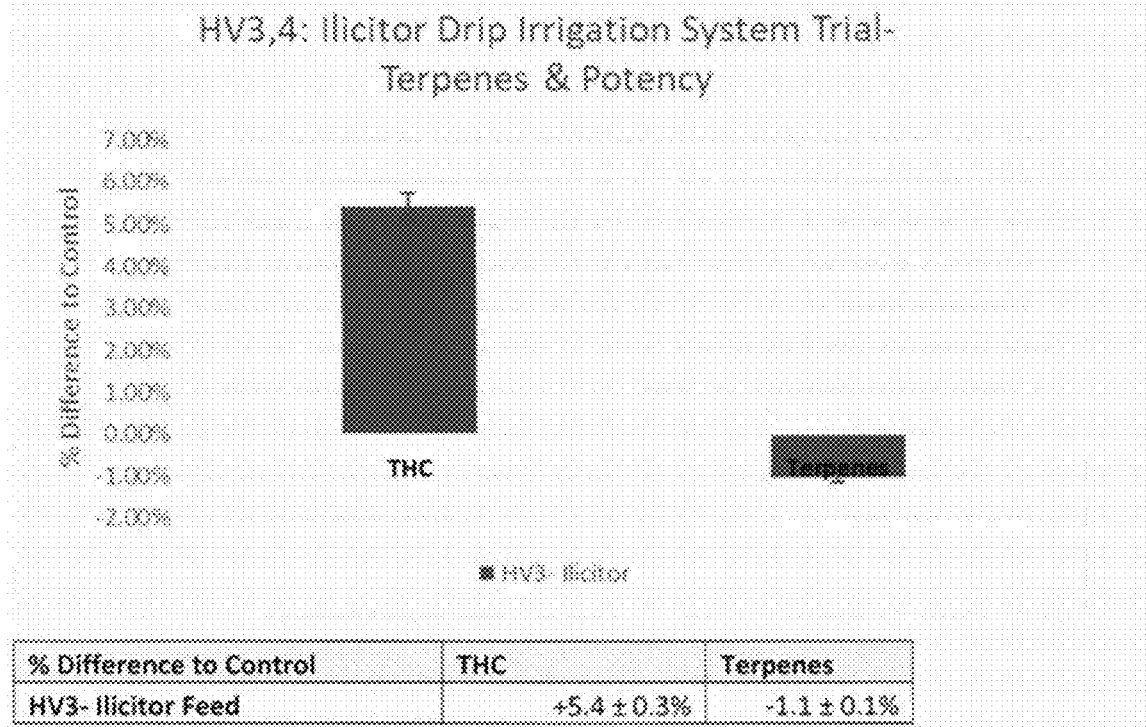

7) FIG. 8 illustrates results for a trial application of a composition described herein in which results labeled HV3 were treated with a foliar spray of the composition and results labeled HV4 relate to control plants. As can be seen, THC content and terpene content for treated plants exceeded those of the control.

Figure 9:
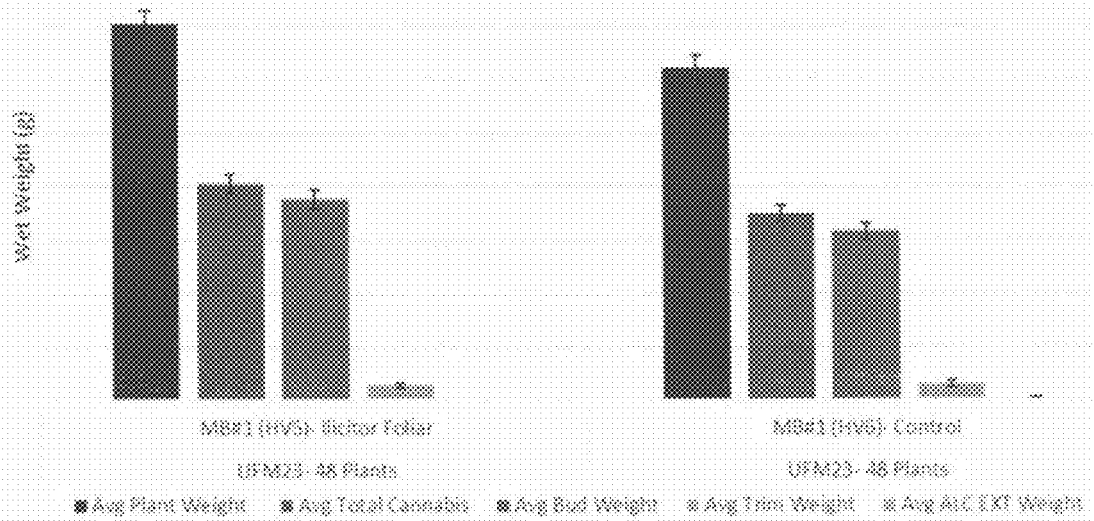
Figure 10:
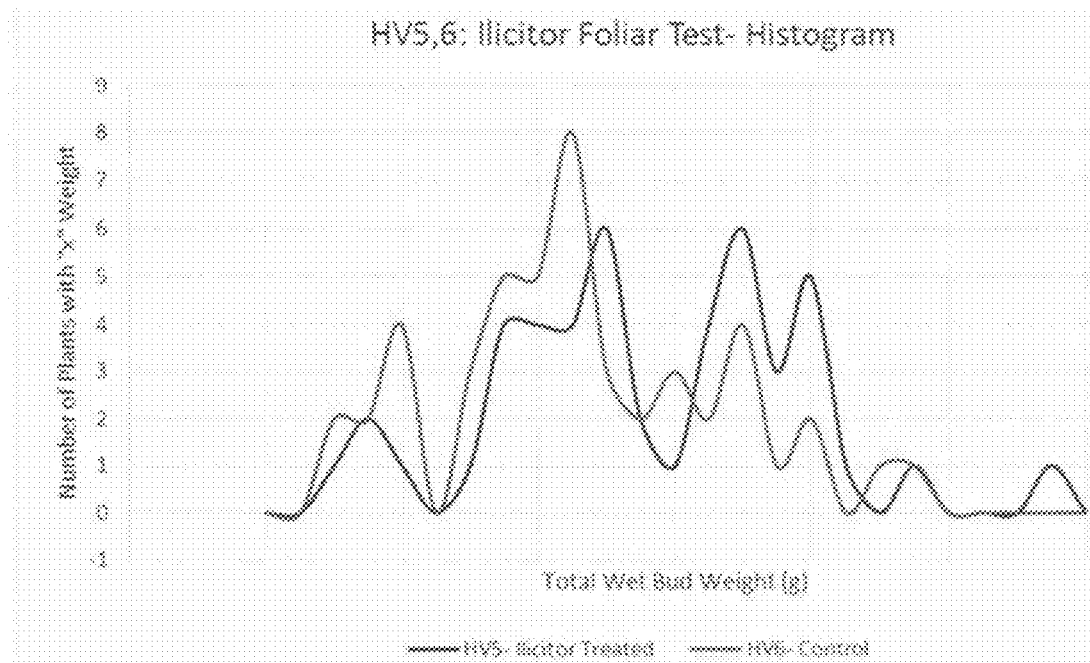
Figure 10:
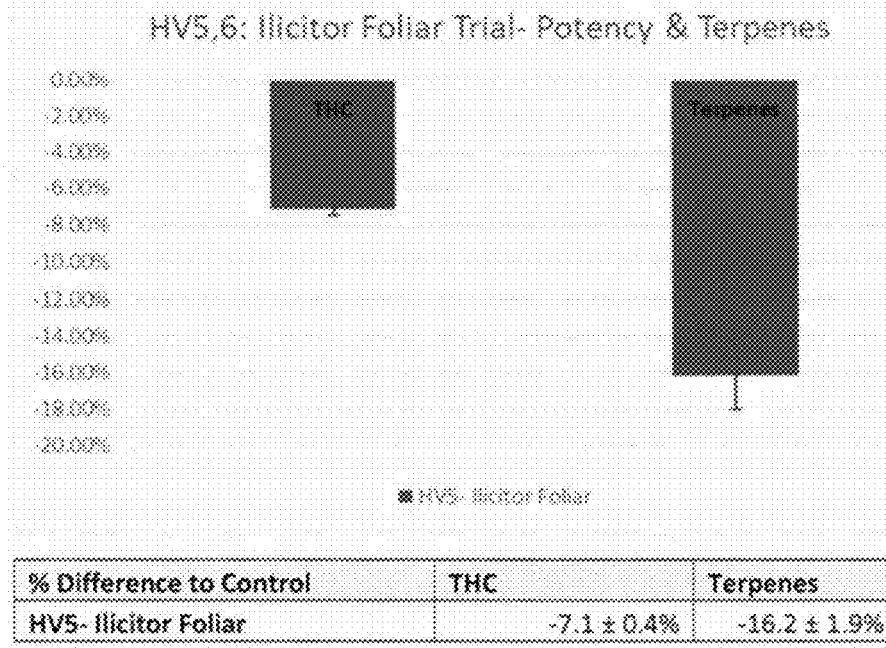

8) FIGS. 9-10 illustrate results for a trial application of a composition described herein in which results labeled HV5 were treated with a foliar spray of the composition and results labeled HV6 relate to control plants. As can be seen, most average weights for treated plants and THC content and terpene content for treated plants exceeded those of the control demonstrating more robust growth.

The foregoing description of the present invention is not intended to limit the invention to the form disclosed herein. Consequently, variations and modifications commensurate with the above teachings, and skill and knowledge of the relevant art, are within the scope of the present invention (such as one or more combinations of the various arrangements, embodiments and approaches disclosed herein).

The embodiments described hereinabove are further intended to explain best modes known of practicing the invention and to enable others skilled in the art to utilize the invention in such, or other embodiments and with various modifications required by the particular application(s) or use(s) of the present invention.

What is claimed is:

1. A composition for providing a systemic acquired response SAR in a plant, comprising:
    a base solution comprising an aqueous mixture including nitrogen;
    chitosan;
    at least one of potassium, phosphorus, or an acidic organic polymer; and
    a micronutrient comprising at least one of boron, calcium, copper, iron, manganese, sulfur, silicon, or zinc;
    wherein potassium comprises about 2.0 wt % of the composition, phosphorus comprises about 3.2 wt % of the composition, boron comprises about 0.021 wt % of the composition, calcium comprises about 0.013 wt % of the composition, copper comprises about 0.025 wt % of the composition, iron comprises about 0.07 wt % of the composition, magnesium comprises about 0.2 wt % of the composition, manganese comprises about 0.01 wt % of the composition, sulfur comprises about 1.1 wt % of the composition, silicon comprises about 0.013 wt % of the composition, zinc comprises about 0.009 wt % of the composition, and an acidic organic polymer comprises about 3.0 wt % of the composition.

2. The composition of claim 1, wherein the base solution comprises not more than about 99 wt % of the composition and the chitosan comprises at least about 0.04 wt % of the composition.

3. The composition of claim 2, wherein the base solution comprises:
    organic material;
    a water-soluble vitamin K containing compound; and
    nitrogen.

4. The composition of claim 3, wherein the organic material comprises not less than about 44% of the base solution, the water-soluble vitamin K containing compound comprises not less than about 4 wt % of the base solution, and the nitrogen comprises not less than about 44.3 wt % of the base solution.

5. The composition of claim 1, wherein the composition comprises a foliar spray.

6. The composition of claim 1, wherein the composition comprises an irrigation fluid.

7. The composition of claim 1, wherein the composition further comprises an acidic organic polymer comprising fulvic acid.

* * * * *